(12) United States Patent
Al-Mehthel et al.

(10) Patent No.: US 9,181,435 B2
(45) Date of Patent: Nov. 10, 2015

(54) SULFUR EXTENDED ASPHALT MODIFIED WITH CRUMB RUBBER FOR PAVING AND ROOFING

(71) Applicants: Saudi Arabian Oil Company, Dhahran (SA); King Fahd University of Petroleum and Minerals, Dhahran (SA)

(72) Inventors: Mohammed Al-Mehthel, Dhahran (SA); Mohammad Anwar Parvez, Dhahran (SA); Hamad I. Al-Abdul Wahhab, Dhahran (SA); Ibnelwaleed A. Hussein, Dhahran (SA); Saleh H. Al-Idi, Dhahran (SA)

(73) Assignees: Saudi Arabian Oil Company, Dhahran (SA); King Fahd University of Petroleum and Minerals, Dhahran (SA)

( * ) Notice: Subject to any disclaimer, the term of this patent is extended or adjusted under 35 U.S.C. 154(b) by 175 days.

(21) Appl. No.: 13/966,571

(22) Filed: Aug. 14, 2013

(65) Prior Publication Data

US 2015/0051322 A1   Feb. 19, 2015

(51) Int. Cl.
*C08L 95/00* (2006.01)
*C08L 17/00* (2006.01)

(52) U.S. Cl.
CPC .................. *C08L 95/00* (2013.01); *C08L 17/00* (2013.01); *C08L 2555/34* (2013.01); *C08L 2555/54* (2013.01); *C08L 2555/80* (2013.01)

(58) Field of Classification Search
CPC . C08L 2555/54; C08L 2555/80; C08L 95/00; C08L 17/00; C08K 3/06
See application file for complete search history.

(56) References Cited

U.S. PATENT DOCUMENTS

| | | | |
|---|---|---|---|
| 5,719,215 A | 2/1998 | Liang et al. | |
| 5,851,276 A | 12/1998 | Memon | |
| 5,936,015 A | 8/1999 | Burns | |
| 5,938,832 A | 8/1999 | Memon | |
| 5,959,007 A | 9/1999 | Liang | |
| 6,387,965 B1 | 5/2002 | Benko et al. | |
| 6,478,951 B1 | 11/2002 | Labib et al. | |
| 7,074,846 B2 | 7/2006 | Sylvester et al. | |
| 7,087,665 B2 | 8/2006 | Sylvester et al. | |
| 7,417,082 B2 | 8/2008 | Martin | |
| 8,198,350 B2 | 6/2012 | Fee et al. | |
| 2007/0249762 A1 | 10/2007 | Sylvester | |
| 2008/0015287 A1 | 1/2008 | Butler et al. | |
| 2011/0015313 A1 | 1/2011 | Martin | |
| 2011/0196073 A1* | 8/2011 | Fee et al. | 524/68 |

FOREIGN PATENT DOCUMENTS

| | | |
|---|---|---|
| EP | 2055745 A1 | 5/2009 |
| WO | 9207018 A1 | 6/1999 |
| WO | 2011/104251 A1 | 9/2011 |

OTHER PUBLICATIONS

PCT The International Search Report and the Written Opinion of the International Searching Authority dated Oct. 20, 2014; International Application No. PCT/US2014/050028; International file Date: Aug. 7, 2014.
Neutag, L., et al.; Performance of Crumb Rubber Modified Binders and Asphalts, 5th International Conference "Bituminous Mixtures and Pavements"; Jan. 3-6, 2011; Thessaloniki, Greece.
Nicholls, J. C.; Shell Thiopave(tm) Sulphur Extended Asphalt Modifier; 5th International Conference "Bituminous Mixtures and Pavements"; Jan. 3-6, 2011; Thessaloniki, Greece.
Parvez, M. A., et al.; Utilization of Sulfur and Crumb Rubber in Asphalt Modification; Journal of Applied Polymer Science; Oct. 29, 2013; pp. 40046-40056; vol. 131, No. 7; Wiley Periodicals, Inc.
Taman, A. R., et al.; Utilisation of Sulphur and Rubber in Modifying Asphalt Binders (Bitumens) for Road Materials; Asphalt Technology; Mar. 31, 1991; pp. 61-69; vol. 41.

* cited by examiner

*Primary Examiner* — Wenwen Cai
(74) *Attorney, Agent, or Firm* — Bracewell & Giuliani LLP; Constance Gall Rhebergen; Linda L. Morgan

(57) ABSTRACT

This invention relates to asphalt compositions. The invention provides a sulfur rubber asphalt binder composition that includes a base asphalt having a softening point, elemental sulfur, and a crumb rubber material. The crumb rubber material is combined with the base asphalt and the elemental sulfur to create the sulfur rubber asphalt binder composition. The crumb rubber material is present in the sulfur rubber asphalt binder in an amount effective to increase the softening point of the composition as compared to the softening point of the base asphalt.

10 Claims, 1 Drawing Sheet

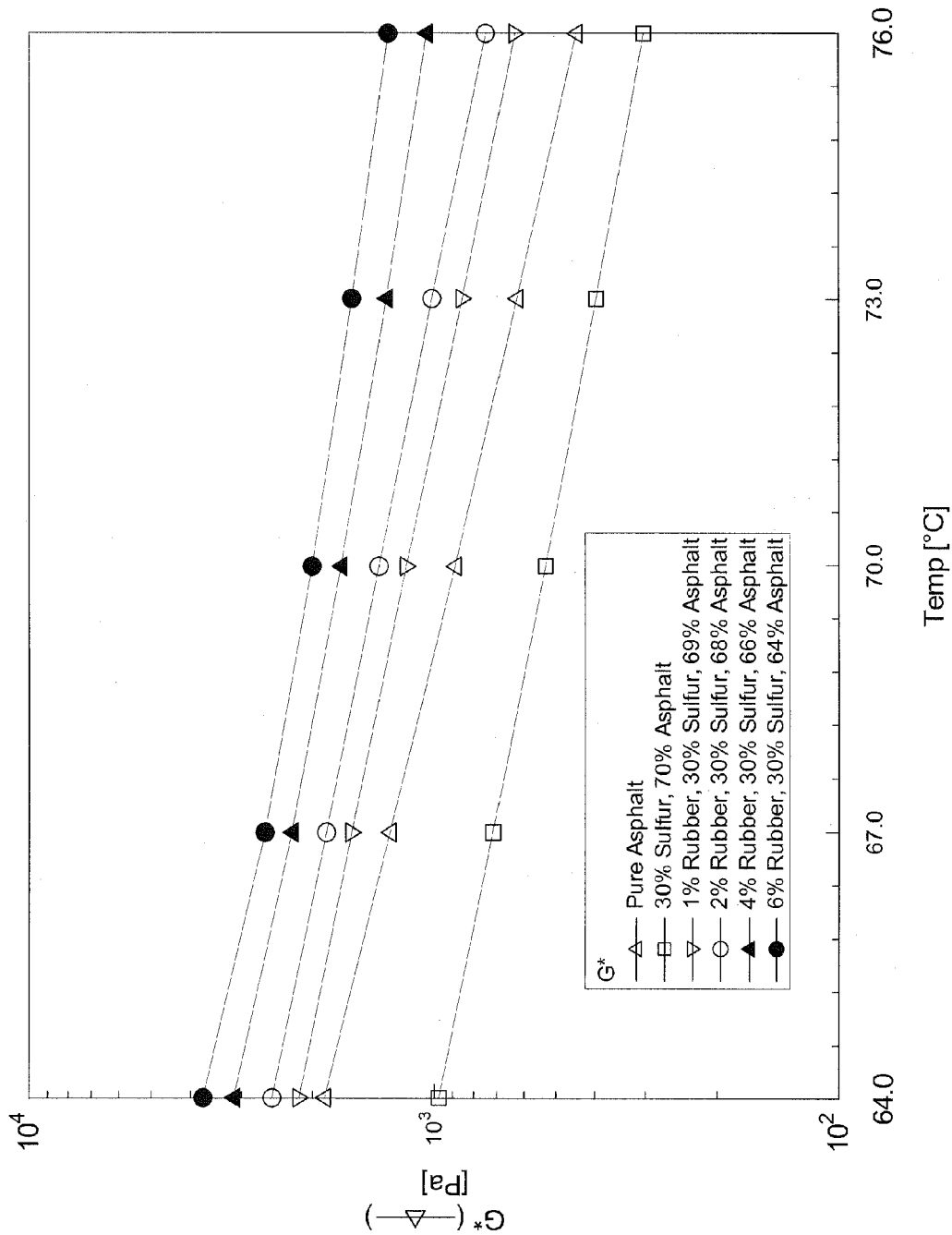

SULFUR EXTENDED ASPHALT MODIFIED WITH CRUMB RUBBER FOR PAVING AND ROOFING

FIELD OF THE INVENTION

This invention relates to asphalt compositions. More specifically, this invention relates to asphalt binder compositions including asphalt, elemental sulfur, and crumb rubber, and methods of making the same.

BACKGROUND OF THE INVENTION

As modern commerce depends on reliable and cost-effective methods for delivering products from suppliers to users, the availability of durable and reliable highways, roads, and other support surfaces for vehicles is vital for sustaining a modern economy. To provide better support surfaces, highways, roads, and sidewalks are commonly paved with a layer or mat of asphaltic concrete that is laid over the surface of the sub-base. Asphalt is preferred over cement to pour roads because it is less expensive and very durable. Asphalt can also be poured at night, which allows major roads to be shut down at the least busy of times for maintenance. Relative to road noise, asphalt is also quieter than cement, making it the better choice for roads.

Asphalts are essentially mixtures of bitumen, as binder, with aggregate, in particular filler, sand, and stones. There are many different types of asphalts available and their characteristics can vary quite significantly. The design of asphalts for bituminous paving applications is a complex process of selecting and proportioning materials to obtain the desired properties in the finished construction while minimizing undesirable characteristics.

In evaluating and adjusting mix designs, the aggregate gradation and the binder content in the final mix design are balanced between the stability and durability requirements for the intended use. The final goal of mix design is to achieve a balance among all of the desired properties. Binders and various polymers have been investigated for reaching similar goals, and other modifications have been studied.

Unsaturated thermoplastic elastomers like styrene-butadiene-styrene (SBS) block copolymers are polymers used for asphalt modification. They enhance the elastic recovery capacities of asphalt and, therefore, its resistance to permanent deformations. However, unsaturated elastomeric polymers are quite expensive and are subjected to degradation when exposed to atmospheric agents and mechanical stress. Due to their fragility, they are typically used as virgin polymers. This can result in a significant cost increase for the product. While SBS is recognized for performance benefits, research has focused on most cost effective modifiers in exchange for sacrificing superior performance.

Olefinic polymers have been investigated for use as modifiers. They are available in large quantities with different mechanical properties and at low cost. Polyethylene (PE) and polypropylene (PP) are plastomers. They bring a high rigidity (i.e., lack of elasticity, resistance to bending) to the product and significantly reduce deformations under traffic load. Due to their non-polar nature, PE and PP suffer from the drawback that they are almost completely immiscible with asphalt, and are thus limited in use.

Conventional asphalts often do not retain sufficient elasticity in use and exhibit a plasticity range which is too narrow for use in many modern applications, such as road construction. The characteristics of road asphalts can be improved by incorporating into them an elastomeric-type polymer. There exists a wide variety of polymers that can be mixed with asphalt. Of these, SBS is a commonly used polymer in asphalt modification. The modified asphalts thus obtained commonly are referred to variously as bitumen/polymer binders or asphalt/polymer mixes. There is a need for a modification to hotmix asphalt concrete mixes that would increase the resistance to permanent deformation while maintaining or increasing the modulus of the mix at intermediate temperatures without affecting the binder properties significantly.

The bituminous binders, even of the bitumen/polymer type, which are employed at the present time in road applications often do not have the optimum characteristics at low enough polymer concentrations to consistently meet the increasing structural and workability requirements imposed on roadway structures and their construction. In order to achieve a given level of modified asphalt performance, various polymers are added at some prescribed concentration. The current practice is to add the desired level of a single polymer, sometimes along with a reactant which promotes cross-linking of the polymer molecules until the desired asphalt properties are met. The reactant is typically sulfur in a form suitable for reacting.

When added to bitumen at 140° C., sulfur is finely dispersed in bitumen as uniformly small particles; coagulation and settlement of sulfur particles become noticeable after a few hours. Therefore, the sulfur extended asphalt (SEA) mixtures can be produced directly in the mixing plant just before the laying of the asphalt mixture. One major concern in handling sulfur-asphalt mix is the fear of the evolution of hydrogen sulfide ($H_2S$) during production and laying. This problem can be ameliorated by adding carbon or ash to sulfur. $H_2S$ evolution starts at temperatures higher than 150° C., so that the application at temperatures up to 150° C. avoids pollution and safety problems. However, $H_2S$ evolution starts well below 150° C., i.e. about 130° C., which is undesirable from an environmental perspective. Moreover, below 120° C., neither the reaction of the asphalt and sulfur nor the cross-linking of the SBS/sulfur blend could take place.

Besides performance and environmental issues associated with many types of asphalt modifiers, many of the polymers that are used to modify asphalt compositions are expensive and can be difficult to obtain in remote areas of the world.

A need exists for a filler than can be used in asphalt compositions. Historically, limestone powder, limestone dust, and cement dust have been used as filler.

SUMMARY

This invention relates to asphalt compositions. More specifically, this invention relates to asphalt binder compositions including asphalt, elemental sulfur, and crumb rubber, and methods of making the same.

In some aspects, the invention provides a sulfur rubber asphalt binder composition that includes a base asphalt having a softening point, elemental sulfur, and a crumb rubber material. The crumb rubber material is combined with the base asphalt and the elemental sulfur to create the sulfur rubber asphalt binder composition. The crumb rubber material is present in the sulfur rubber asphalt binder in an amount effective to increase the softening point as compared to the softening point of the base asphalt.

In another aspect, the invention provides using the sulfur rubber asphalt binder composition to make an asphalt composition that also includes an aggregate material and a filler.

In another aspect, the invention provides a method of making the sulfur rubber asphalt binder composition. The crumb rubber material is mixed with the base asphalt at a first predetermined temperature in a high shear blender for first predetermined amount of time to create an asphalt crumb rubber mixture. The asphalt crumb rubber mixture is then placed in a sealed container in an oven at the first predetermined temperature for a second predetermined amount of time. The elemental sulfur is added to the asphalt crumb rubber mixture and mixed for a third predetermined amount of time at a second predetermined temperature such that intimate mixing of the elemental sulfur and the asphalt crumb mixture is achieved.

BRIEF DESCRIPTION OF THE DRAWINGS

FIG. 1 shows the PG test summary of sulfur/asphalt/crumb rubber binders.

DETAILED DESCRIPTION OF THE INVENTION

Although the following detailed description contains many specific details for purposes of illustration, it is understood that one of ordinary skill in the art will appreciate that many examples, variations, and alterations to the following details are within the scope and spirit of the invention. Accordingly, the exemplary embodiments of the invention described herein and provided in the appended figures are set forth without any loss of generality, and without imposing limitations, on the claimed invention.

In some aspects, the invention provides a sulfur rubber asphalt binder composition that includes a base asphalt having a softening point, elemental sulfur, and a crumb rubber material. The crumb rubber material is combined with the base asphalt and the elemental sulfur to create the sulfur rubber asphalt binder composition. The crumb rubber material is present in the sulfur rubber asphalt binder in an amount effective to increase the softening point as compared to the softening point of the base asphalt.

In some embodiments, the sulfur rubber asphalt binder composition ranges from about 45% wt to 80% wt base asphalt. In some embodiments, the composition ranges from about 55% wt to 75% wt base asphalt. In some embodiments, the composition is about 45% wt base asphalt. In some embodiments, the composition is about 50% wt base asphalt. In some embodiments, the composition is about 55% wt base asphalt. In some embodiments, the composition is about 60% wt base asphalt. In some embodiments, the composition is about 65% wt base asphalt. In some embodiments, the composition is about 70% wt base asphalt. In some embodiments, the composition is about 75% wt base asphalt. In some embodiments, the composition is about 80% wt base asphalt.

In further embodiments, the sulfur rubber asphalt binder composition ranges from about 10% wt to 50% wt elemental sulfur. In further embodiments, the elemental sulfur is up to 50% wt. In further embodiments, the sulfur rubber asphalt binder composition is about 5% wt elemental sulfur. In further embodiments, the sulfur rubber asphalt binder composition is about 10% wt elemental sulfur. In further embodiments, the sulfur rubber asphalt binder composition is about 15% wt elemental sulfur. In further embodiments, the sulfur rubber asphalt binder composition is about 20% wt elemental sulfur. In further embodiments, the sulfur rubber asphalt binder composition is about 25% wt elemental sulfur. In further embodiments, the sulfur rubber asphalt binder composition is about 30% wt elemental sulfur. In further embodiments, the sulfur rubber asphalt binder composition is about 35% wt elemental sulfur. In further embodiments, the sulfur rubber asphalt binder composition is about 40% wt elemental sulfur. In further embodiments, the sulfur rubber asphalt binder composition is about 45% wt elemental sulfur. In further embodiments, the sulfur rubber asphalt binder composition is about 50% wt elemental sulfur. In further embodiments, the elemental sulfur is in solid form. In some embodiments, the elemental sulfur is powder. In other embodiments, the sulfur is in liquid form.

In further embodiments, the sulfur rubber asphalt binder composition ranges from about 1% wt to 6% wt crumb rubber material. In further embodiments, the sulfur rubber asphalt binder composition is about 1% wt crumb rubber material. In further embodiments, the sulfur rubber asphalt binder composition is about 2% wt crumb rubber material. In further embodiments, the sulfur rubber asphalt binder composition is about 3% wt crumb rubber material. In further embodiments, the sulfur rubber asphalt binder composition is about 4% wt crumb rubber material. In further embodiments, the sulfur rubber asphalt binder composition is about 5% wt crumb rubber material. In further embodiments, the sulfur rubber asphalt binder composition is about 6% wt crumb rubber material.

In a further embodiment, the asphalt is about 58% wt, elemental sulfur is about 40% wt, and the crumb rubber material is 2% wt.

In another aspect, the invention provides using the sulfur rubber asphalt binder composition to make an asphalt composition that also includes an aggregate material and a filler.

In further embodiments, the aggregate material is a gravel, sand, or stones. In some embodiments, the filler is a mineral filler.

The asphalt compositions of the present invention have improved properties over that of the base asphalt alone. For instance, in some embodiments, the asphalt composition has greater temperature resistance than that of the base asphalt alone. In further embodiments, the asphalt composition has improved waterproofing properties as compared to that of the base asphalt of alone. In other embodiments, the asphalt composition has improved damp-proofing properties as compared to that of the base asphalt alone.

The asphalt compositions described herein can be used for a number of different purposes, including applications where improved waterproofing and damp proofing are desired. In some embodiments, the asphalt composition is used in paving applications. In some embodiments, the asphalt composition is used in asphalt concrete pavement. In other embodiments, the asphalt is used in roofing applications. The asphalt compositions can be used in any applications where use of a sulfur extended asphalt would be beneficial.

In another aspect, the invention provides a method of making the sulfur rubber asphalt binder composition. The crumb rubber material is mixed with the base asphalt at a first predetermined temperature in a high shear blender for first predetermined amount of time to create an asphalt crumb rubber mixture. The asphalt crumb rubber mixture is then placed in a sealed container in an oven at the first predetermined temperature for a second predetermined amount of time. The elemental sulfur is added to the asphalt crumb rubber mixture and mixed for a third predetermined amount of time at a second predetermined temperature such that intimate mixing of the elemental sulfur and the asphalt crumb mixture is achieved.

In some embodiments, the first predetermined temperature ranges from about 170° C. to about 190° C. In further embodiments, the first predetermined temperature is about 180° C. In the first predetermined temperature range, the crumb rubber typically swells.

In some embodiments, the second predetermined temperature ranges from about 140° C. to about 150° C. In further embodiments, the second predetermined temperature is about 145° C. In the second predetermined temperature range, the sulfur is blended with the asphalt.

In some embodiments, the first predetermined amount of time ranges from about 1 to 5 minutes. In further embodiments, the first predetermined amount of time is about 2 minutes. In the first predetermined amount of time, the crumb rubber is mixed with asphalt before it swells.

In some embodiments, the second predetermined amount of time ranges from about 90 to 150 minutes. In further embodiments, the second predetermined amount of time is about 120 minutes. During the second predetermined amount of time, the crumb rubber typically swells.

In some embodiments, the third predetermined amount of time ranges from about 15 to 25 minutes. In further embodiments, the third predetermined amount of time is about 20 minutes. In the third predetermined amount of time, sulfur is blended with the asphalt crumb mixture.

EXAMPLES

The following tests were carried out on various asphalt compositions as reported below: Penetration tests were conducted in accordance with ASTM D5, Softening Points tests were conducted in accordance with ASTM D36, and performance grading was conducted.

TABLE 1

Softening Points and Pentration Grade

| Sample # | Sample composition | Softening point (° C.) | Penetration grade |
|---|---|---|---|
| 1 | Pure asphalt | 52.4 | 52 |
| 2 | R 1%, S 40% and A 59% | 59.5 | 46.2 |
| 3 | R 2%, S 40% and A 58% | 65.5 | 44.3 |
| 4 | R 0%, S 40% and A 60% | 56.5 | 50.4 |
| 5 | R 0%, S 50% and A 50% | 60.3 | 48.5 |

S: Sulfur, R: Crumb rubber, A: Asphalt

The results of softening point and penetration grade are presented in Table 1. The result showed that the increase in rubber composition increased the softening point while decreasing the penetration grade. Increase in softening point indicated that the composition had greater temperature resistance and an increased range of applications. Increase in penetration grade increased the stiffness and also increased the range of applications.

TABLE 2

Percentages of different components

| Sample # | Sulfur % | Asphalt % | Crumb rubber % | PG |
|---|---|---|---|---|
| 1 | 0 | 100 | 0 | 64-10 |
| 2 | 30 | 70 | 0 | 64-10 |
| 3 | 40 | 60 | 0 | 64-10 |
| 4 | 20 | 79 | 1 | 64-10 |
| 5 | 20 | 78 | 2 | 64-10 |
| 6 | 20 | 76 | 4 | 70-10 |
| 7 | 20 | 74 | 6 | 70-10 |
| 8 | 30 | 69 | 1 | 70-10 |
| 9 | 30 | 68 | 2 | 70-10 |
| 10 | 30 | 66 | 4 | 76-10 |
| 11 | 30 | 64 | 6 | 76-10 |
| 12 | 40 | 59 | 1 | 76-10 |
| 13 | 40 | 58 | 2 | 76-10 |
| 14 | 40 | 56 | 4 | 76-10 |
| 15 | 40 | 54 | 6 | 82-10 |
| 16* | 50 | 49 | 1 | 76-10 |
| 17 | 50 | 48 | 2 | 76-10 |
| 18 | 50 | 46 | 4 | 82-10 |
| 19 | 50 | 44 | 6 | 88-10 |

Table 2 represents the PG test summary of pure asphalt and different sulfur/asphalt/rubber binder compositions. The PG test was performed in accordance to the Strategic Highway Research Program (SHRP) method AASHTO MP 1-98. The data showed that sample number 16 had the greatest amount of sulfur content and minimum amount of additive to achive the PG76-10. The result showed that increase in sulfur content from 30% to 40% without additive did not result in a change of the PG. However, the addition of crumb rubber to the sulfur/asphalt samples increased PG, which in turn increased the temperature range of applications.

FIG. 1 represents typical complex modulus (G*) versus temperature (T) plot for 30% sulfur and 1-6% rubber modified binder. FIG. 1 indicates that 30/70 sulfur asphalt binder had lower G* values compared to base asphalt. However, addition of crumb rubber to 30% sulfur modified asphalt increased its complex modulus significantly.

Table 3 shows the values of complex modulus for 30% and 40% sulfur modified binder with 0-6% rubber content for three different temperature levels. The values showed that increased rubber content increased the complex modulus of the modified binder. Additionally, the percentage increase in G* is higher at higher temperature, indicating that rubber increased temperature resistance of the modified binder.

TABLE 3

Complex modulus of 30% and 40% sulfur binder for different rubber content

| Sample # | Sample compositions | Complex modulus, G* (Pa) @ 67° C. | Percentage increase in G* | Complex modulus, G* (Pa) @ 73° C. | Percentage increase in G* | Complex modulus, G* (Pa) @ 79° C. | Percentage increase in G* |
|---|---|---|---|---|---|---|---|
| 1 | Pure Asphalt | 1121.51 | | 563.29 | | 295.11 | |
| 2 | 30% Sulfur, 70% Asphalt | 718.67 | −35.92 | 398.74 | −29.21 | 243.08 | −17.63 |
| 3 | 1% Rubber, 30% Sulfur, 69% Asphalt | 2225.52 | 72.88 | 1452.36 | 131.57 | 848.50 | 162.56 |
| 4 | 2% Rubber, 30% Sulfur, 68% Asphalt | 3056.92 | 137.47 | 1886.56 | 200.81 | 1021.30 | 216.03 |
| 5 | 4% Rubber, 30% Sulfur, 66% Asphalt | 3850.00 | 199.07 | 2390.43 | 281.15 | 1273.07 | 293.94 |
| 6 | 6% Rubber, 30% Sulfur, 64% Asphalt | 6290.02 | 388.62 | 3625.21 | 478.03 | 1899.08 | 487.65 |

TABLE 3-continued

Complex modulus of 30% and 40% sulfur binder for different rubber content

| Sample # | Sample compositions | Complex modulus, G* (Pa) @ 67° C. | Percentage increase in G* | Complex modulus, G* (Pa) @ 73° C. | Percentage increase in G* | Complex modulus, G* (Pa) @ 79° C. | Percentage increase in G* |
|---|---|---|---|---|---|---|---|
| 7 | 40% Sulfur, 60% Asphalt | 968.47 | −13.65 | 630.60 | 11.95 | 419.12 | 42.02 |
| 8 | 1% Rubber, 40% Sulfur, 59% Asphalt | 1606.41 | 24.79 | 955.71 | 52.39 | 628.75 | 94.56 |
| 9 | 2% Rubber, 40% Sulfur, 58% Asphalt | 1852.46 | 43.90 | 1017.68 | 62.27 | 542.01 | 67.72 |
| 10 | 4% Rubber, 40% Sulfur, 56% Asphalt | 2244.69 | 74.37 | 1313.37 | 109.41 | 876.54 | 171.24 |
| 11 | 6% Rubber, 40% Sulfur, 54% Asphalt | 2626.82 | 104.06 | 1596.02 | 154.48 | 1080.70 | 234.41 |

Marshall Stability of the samples were calculated in accordance with ASTM D6927. Three samples for each of the designed compositions were tested to obtain an average stability in kN. The results showed that pure asphalt concrete compositions had the highest stability of 20.38 kN. Increases in sulfur content of the compositions decreased the stability of the compositions in general. All other compositions had stability ranging from 15 to 20 kN. Increased sulfur content of the compositions decreased the stability of the compositions in general. The reason for the decrease in stability with sulfur content can be due the free sulfur content of the compositions. The unbounded sulfur in the compositions will lead to a softening the composition through water penetration during the two hours conditioning in water bath at 60° C. However, this decrease in stability was minimized through crumb rubber modification. Results of stability and designed compositions are shown in Table 4.

Resilient modulus ($M_R$) is an important variable for the mechanistic design approaches of pavemented structures. It is the measure of pavement response in terms of dynamic stresses and corresponding resulting strains. Resilient modulus of hot mix asphalt (HMA) was assessed by applying diametral pulse loads to the samples. The load was applied in the vertical diametrical plane of a cylindrical specimen of 63.5-mm height by 101.6-mm diameter. The samples were prepared using the Superpave compaction method. The resulting horizontal deformation of the specimens was measured and used to calculate the resilient modulus. The test was performed at 25° C. Pure asphalt concrete composition had the lowest $M_R$ value. Sulfur modified asphalt concrete had improved resilient modulus compared to the other compositions. The modified compositions were stiffer than the plain compositions. Addition of sulfur resulted in increased stiffness and the addition of rubber increased the elasticity of the compositions, which increased the resilience of the compositions to dynamic loads as a result of the improvement in the binder elastic properties. Results are shown in Table 4.

The Indirect Tensile Strength (ITS) test (AASHTO T-245) was used to explore composition resistance to cracks development utilizing ITS. The ITS test was performed on cylindrical specimens of 63.5-mm height by 101.6-mm diameter. Samples were prepared for dry and wet ITS testing following exposure to the Superpave compaction method. The maximum load the specimen would carry before failure was determined (known as the ITS). The test was carried out at 25° C. for dry ITS specimens. Three samples were conditioned in a water bath of 60° C. for 24 hours and then put into a water bath of 25° C. for 2 hours. The samples were then tested for wet ITS. Durability was calculated using the ratio of ITS of the conditioned specimen to ITS of the unconditioned specimen. Results of the ITS test and durability are shown in Table 4.

Three compositions were selected for the test of rutting (AASHTO TP 63-06) and fatigue resistance (AASHTO T321). Rutting resistance of the selected samples was evaluated using the asphalt pavement analyzer (APA) at 64° C. Wheel load was set to 45.5 kg (100 lb), and wheel pressure was set to 689.5 kPa (100 psi), and there were 8000 load repetitions. 150 mm test samples were compacted using a gyratory compactor to the required density of 2550 tp 2700 kg/m³. Test samples were conditioned at test temperature for 4 hours.

The results indicated that modified compositions had less rutting compared to pure asphalt concrete composition.

TABLE 4

| Sample | Sulfur % | Asphalt % | Crumb rubber % | Stability KN | PG | Mr Mpa | Dry ITS, kPa | Wet ITS, kPa | Durability, % | Rutting mm |
|---|---|---|---|---|---|---|---|---|---|---|
| 1 | | 100 | 0 | 20.38 | 64-10 | 5342.50 | 1260.93 | 769.44 | 61.02 | 6.23 |
| 2 | 20 | 76 | 4 | 19.13 | 70-10 | 7200.83 | 1434.02 | 1097.85 | 76.56 | 3.82 |
| 3 | 20 | 74 | 6 | 18.36 | 70-10 | 7341.75 | 1552.43 | 983.76 | 63.37 | |
| 4 | 30 | 66 | 4 | 17.95 | 76-10 | 8129.50 | 1402.11 | 936.86 | 66.82 | 4.68 |
| 5 | 30 | 64 | 6 | 18.03 | 76-10 | 8635.33 | 1783.85 | 993.32 | 55.72 | |
| 6 | 40 | 59 | 1 | 17.47 | 76-10 | 8547.42 | 1389.49 | 1157.31 | 83.29 | |
| 7 | 40 | 58 | 2 | 16.18 | 76-10 | 6500.75 | 1315.23 | 869.95 | 66.14 | |
| 8 | 50 | 49 | 1 | 17.06 | 76-10 | 11161.67 | 1462.93 | 1163.21 | 79.51 | |
| 9 | 50 | 48 | 2 | 16.42 | 76-10 | 7526.42 | 1248.50 | 1041.48 | 83.41 | |
| 10 | 50 | 46 | 4 | 15.67 | 82-10 | 7710.67 | 1443.66 | 483.03 | 33.46 | |

TABLE 5

| Examples | Sulfur % | Asphalt % | Rubber % | PG |
|---|---|---|---|---|
| 1 | 0 | 100 | 0 | 64-10 |
| 2 | 30 | 70 | 0 | 64-10 |
| 3 | 40 | 60 | 0 | 64-10 |
| 4 | 20 | 76 | 4 | 70-10 |
| 5 | 30 | 66 | 4 | 76-10 |
| 6 | 40 | 56 | 4 | 76-10 |
| 7 | 50 | 46 | 4 | 82-10 |

An additional PG test was performed on seven additional samples according to the same parameters as the results reported in Table 2. The results of this additional test showed that higher sulfur content in the binder required smaller percentage of crumb rubber to achieve the same PG grade, as detailed in Table 5. The findings detailed in Table 5 are surprising and un-expected.

In summary, the crumb rubber sulfur asphalt compositions increased the $M_R$ compared to that of asphalt alone, crumb rubber sulfur asphalt increased the ITS of the compositions compared to that of asphalt alone, and crumb rubber sulfur asphalt increased the rutting resistance of the compositions compared to that of asphalt alone.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a," "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

What is claimed is:

1. A sulfur rubber asphalt binder composition comprising:
   about 58% by weight a base asphalt having a softening point;
   about 40% by weight elemental sulfur; and
   2% by weight a crumb rubber material;
   wherein the crumb rubber material is combined with the base asphalt and the elemental sulfur to create the sulfur rubber asphalt binder composition, and
   wherein the crumb rubber material is present in the sulfur rubber asphalt binder composition in an amount effective to increase the softening point of the composition as compared to the softening point of the base asphalt.

2. An asphalt composition comprising:
   the sulfur rubber asphalt binder composition of claim 1;
   an aggregate material; and
   a filler.

3. The asphalt composition of claim 2 wherein the aggregate material is a gravel.

4. The asphalt composition of claim 2 wherein the filler is a mineral filler.

5. The asphalt composition of claim 2 wherein the asphalt composition has greater temperature resistance than that of asphalt alone.

6. The asphalt composition of claim 2 wherein the asphalt composition has improved waterproofing properties as compared to that of the base asphalt.

7. The asphalt composition of claim 2 wherein the asphalt composition has improved damp-proofing properties as compared to that of the base asphalt.

8. The asphalt composition of claim 2 is use in paving.

9. The asphalt composition of claim 2 is use in roofing.

10. A sulfur rubber asphalt binder composition consisting essentially of:
    54% by weight a base asphalt having by a softening point;
    40% by weight elemental sulfur; and
    6% by weight a crumb rubber material;
    wherein the crumb rubber material is combined with the base asphalt and the elemental sulfur to create the sulfur rubber asphalt binder composition, and
    wherein the crumb rubber material is present in the sulfur rubber asphalt binder composition in an amount effective to increase the softening point of the composition as compared to the softening point of the base asphalt.

* * * * *

UNITED STATES PATENT AND TRADEMARK OFFICE
CERTIFICATE OF CORRECTION

PATENT NO. : 9,181,435 B2  
APPLICATION NO. : 13/966571  
DATED : November 10, 2015  
INVENTOR(S) : Al-Mehthel et al.

Page 1 of 1

It is certified that error appears in the above-identified patent and that said Letters Patent is hereby corrected as shown below:

In the claims

Column 10, Line 38, Claim 8, "use" should read --used--.

Column 10, Line 39, Claim 9, "use" should read --used--.

Signed and Sealed this  
First Day of March, 2016

Michelle K. Lee  
*Director of the United States Patent and Trademark Office*